United States Patent [19]

Phelon

[11] Patent Number: 4,746,825
[45] Date of Patent: May 24, 1988

[54] ALTERNATOR CORE ATTACHMENT

[75] Inventor: Russell D. Phelon, Longmeadow, Mass.

[73] Assignee: R. E. Phelon Company, Inc., East Longmeadow, Mass.

[21] Appl. No.: 19,040

[22] Filed: Feb. 26, 1987

Related U.S. Application Data

[63] Continuation of Ser. No. 373,175, Apr. 29, 1982, abandoned.

[51] Int. Cl.⁴ .............................................. H22K 11/00
[52] U.S. Cl. .................................. 310/70 R; 310/259; 336/67
[58] Field of Search ...................... 310/70 A, 70 R, 74, 310/259; 336/67, 210

[56] References Cited

U.S. PATENT DOCUMENTS 2,883,590  4/1959  Axman ................................ 336/210
3,484,677 12/1969  Piteo .................................. 310/70 R
4,358,727 11/1982  Campen ............................. 310/70 A Primary Examiner—Patrick R. Salce
Assistant Examiner—Anita M. Ault
Attorney, Agent, or Firm—Chapin, Neal & Dempsey

[57] ABSTRACT

An alternator or generator core attachment is provided for connecting to a ferromagnetic coil of a magneto used in the ignition system of small combustion engines. The attachment includes a radially extending leg portion, on which a generator coil is wound, a cross bar portion and a flange adapted to be attached to one of the poles of the magneto core. By this construction, the pole of the magneto to which the flange is attached is integrated into a magnetic flux path with the radially extending leg and cross bar portion of the attachment.

2 Claims, 1 Drawing Sheet

ALTERNATOR CORE ATTACHMENT

BACKGROUND OF THE INVENTION

This application is a continuation of may copending application, Ser. No. 373,175, filed Apr. 29, 1982 (now abandoned).

This invention is related to magneto ignition systems used on small internal combustion engines in which a battery powered system is provided for starting the engine.

Conventionally, small internal combustion engines, such as used on power lawn mowers and the like, utilize magneto ignition systems. In these applications, a permanent magnet-pole shoe group is usually embedded in the rim of the engine fly wheel. As this pole group rotates past the stator, which may include a coil core group, such as shown in U.S. Pat. No. 3,484,677 to Piteo, flux in the core induces a voltage in the magneto coil. As the primary coil circuit of the magneto coil is interrupted, such as by breaker points or electronic switching means, an ignition pulse is generated for the spark plug of the engine.

The magneto core is commonly a three leg E-shaped core with the magneto coil being wound on the center leg of the core. Conventionally, these small magneto operated ignition systems are cranked by hand and involve the use of a rope or recoil-type starter mechanism, which rotates the engine fly wheel with sufficient velocity to generate adequate engine starting voltages.

In recent years, stringent consumer safety regulations have been imposed on small engine applications and, in particular for rotary lawn mowers. Changes have come about because the new safety requirements for recoil starters have posed many design difficulties to the industry. In some cases, engine manufacturers have found it preferable to replace the recoil starters with a battery operated starting system. With the latter type system, installation of a separate generator or alternator coil is provided for "trickle charging" the battery when the engine is running. Usually, in this type of installation, the generator coil is either located on a separate flux carrying core, or a new coil core is especially designed for these types of installations.

The principal object of this invention is to provide a coil/core attachment adapted to be readily combined with an existing commercial magneto structure. The attachment provides for a simple and economical conversion of existing magneto ignition engine systems to systems having battery charging capabilities.

Another object of this invention is to provide a flux carrying core attachment for a generator coil which utilizes a portion of the flux path of an existing magneto core.

The above and other objects and advantages of this invention will be more readily appreciated from a reading of the following detailed description in conjunction with the accompanying drawing, in which.

Figure 1:
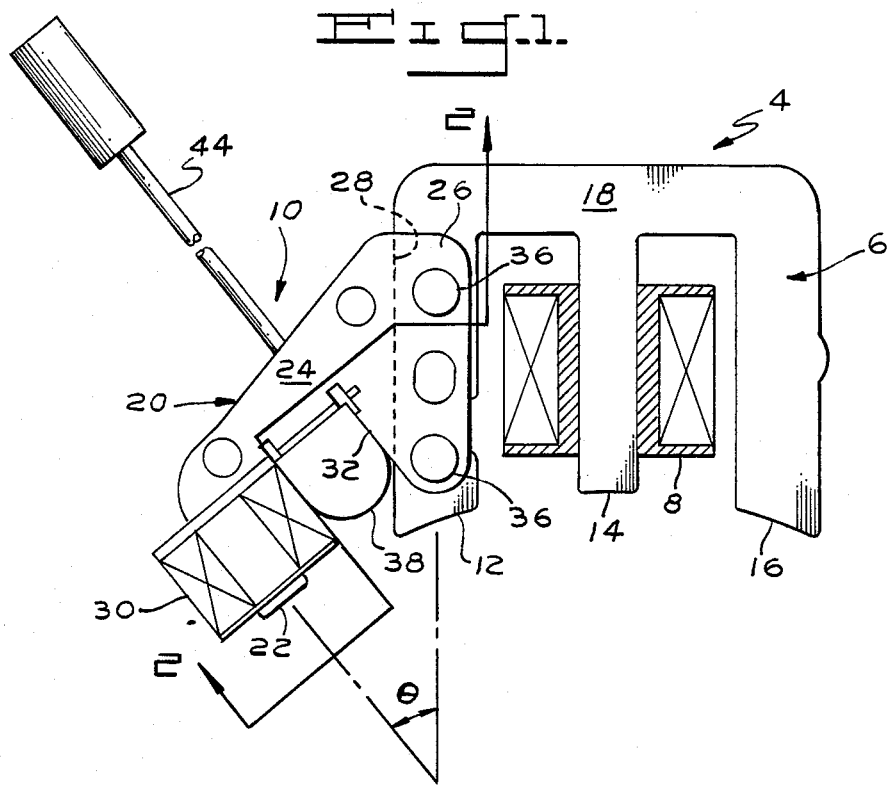
FIG. 1 is an elevational view showing a core attachment for an alternator of the type embodying this invention fitted onto the core of a magneto.

Referring in detail to the drawing, in FIG. 1 is shown a stator assembly 4, comprising a ferromagnetic core 6 and a magneto ignition coil 8 disposed on the middle pole or leg of the core. The coil/core attachment generally illustrated at 10 is affixed to one of the outer legs of the core 6.

The core 6 is a ferromagnetic flux conducting member fabricated of a laminated build-up of iron stampings. The core includes 3 poles or leg portions 12, 14 and 16 which extend in a generally radial direction relative to the path of rotation of a permanent magnetic means carried in the engine flywheel (not shown). The core also includes a cross bar portion 18 spanning the inner ends of the three poles. The outer ends or the tips of the poles are disposed adjacent the circular path of movement of the permanent magnet assembly carried in the engine fly wheel. As the magnet assembly rotates sequentially past the three poles or legs of the core, flux first flows in one direction in the middle leg of the core, and the direction of flux is then reversed in the middle leg. This flux reversal induces a large voltage in the primary winding of the coil 8 and upon interruption, the resulting voltage drop provides the ignition pulse for the engine.

Figure 2:
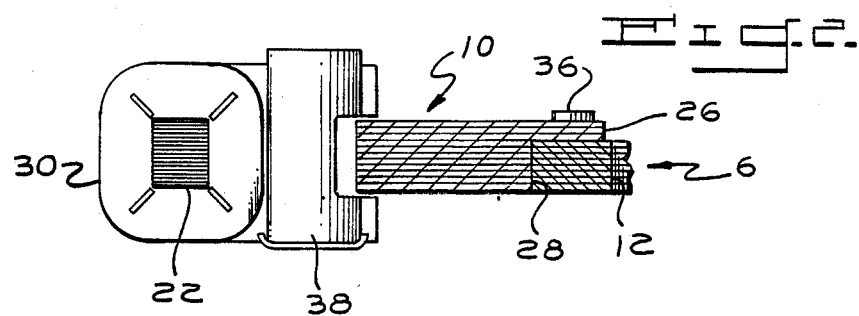
FIG. 2 is a sectional view taken along line 2—2 of FIG. 1.

Integrated with the core 6 and in particular, with one of the outer poles 12 is an attachment 20 of the type embodying this invention. The attachment is in the form of a laminated iron core portion or partial core having one radially extending core leg 22, a transversely extending cross bar portion 24 and a flange portion 26. As best illustrated in FIG. 2, the flange extends outwardly of an undercut surface 28 and is preferably integral with the attachment 20. The surface 28 defines the outer edge of a triangular or wedge shaped portion 32 of the core, which lies between the flange 26 and the cross bar portion 24. The surface 28 is generally planar and is diposed at an angle O to the axis or center line of the core leg 22. As a result, when the surface 28 is placed in abutting relation against the outer side edge of the core leg 12, the tip of the leg 22 will be positioned along the same circumference as the outer ends of the poles of the magneto core 6. As a result, all four poles or core legs 12, 14, 16 and 22 are positioned adjacent the circular path of the permanent magnet group carried by the engine fly wheel.

The partial core 10 thus has one leg portion 22 extending radially with respect to the rotating magnetic field, and a generator or battery charging coil is wound about the leg 22. From the inner end of the leg 22, cross bar portion 24 extends laterally from the leg 22 to the triangular or wedge-shaped portion 32 of the partial core 10. In a sense, the wedge-shaped portion 32 of the core may be considered as a core leg portion which is integrated into a flux carrying structure with the core leg 12 of a magneto core. The laminar mounting flange 26, as best shown in FIG. 2, extends a substantial distance beyond the side edge 28 for flush surface-to-surface mounting against the outer surface of the core leg 12. The flange 26 may be fastened thereto by fasteners, such as rivets 36. The mounting flange 26 and the undercut surface 28 form a dihedral angle adapted to fit snugly about a corner of core leg 12. The flange 26 serves as both a mounting bracket for supporting the coil/core group 10 and provides a path for carrying magnetic flux, and the flux carrying function of the flange 26 substantially overcomes the occurrence of any small voids or air gaps at the interface between the surface 28 and the side of leg 12. With this construction, the leg 12 is integrated into the same magnetic circuit as the leg 22 on which the coil 30 is wound. The core leg 12 continues, of course, to perform its conventional function of providing a portion of the flux path for the mageto coil 8.

Figure 3:
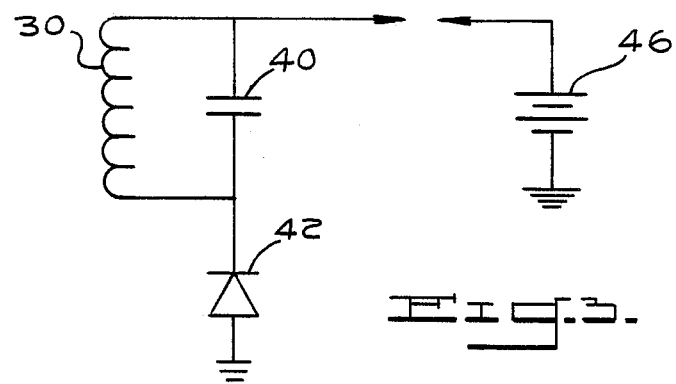
FIG. 3 is a schematic wiring diagram illustrating an electronic system which may be used in conjunction with this invention.

An electronic module 38, comprising capacitor 40 and rectifier diode 42 (FIG. 3) is disposed along the inner edge of the cross bar 24. An electrical lead 44 is provided for connecting the electronic circuit with a terminal of the battery 46. With the arrangement of the component shown in FIG. 3, the battery 46 will be charged during operation of the invention, on which the stator 4 is mounted.

Having thus described my invention, what is claimed is:

1. Generator coil/core attachment for the stator of a magneto coil mounted on the pole of a ferromagnetic core having a plurality of radially extending poles disposed adjacent the circular path of a rotor, including permanent magnet flux generating means, said attachment comprising an integral flux carrying core of laminated construction including one radially extending leg having a generator coil mounted thereon, a cross bar portion and a laminated mounting flange portion which serves as a portion of a flux path for said generator coil and is adapted to be connected against the outer surface of one of the poles of the magneto core, said attachment including a side edge surface underlying said flange, said side edge surface lying at an oblique angle to the axis of said one radially extending leg and being abutted against the outer side surface of one of said magneto poles, the tip of said leg being disposed adjacent the same circular path as the tips of said magneto poles, whereby said attachment provides a flux path for the generator coil, said flux path including said one leg, the cross bar, the mounting flange and the pole of the magneto coil onto which said flange is mounted.

2. Generator coil/core attachment, as set forth in claim 1, in which said flange and the obliquely extending side surface of the attachment define a dihedral angle which fits onto a corner of the magneto pole on which said attachment is affixed whereby the flux carrying function of the flange serves to overcome the occurrence of any air gaps between the side edge surface of the attachment and the outer side surface of the one said magneto pole.

* * * * *